Feb. 2, 1971   C. R. VENABLE, JR   3,560,164
CARBON BLACK REACTOR

Filed July 30, 1969   2 Sheets-Sheet 1

INVENTOR.
C. R. VENABLE, JR.

BY

*Young & Quigg*
ATTORNEYS

United States Patent Office 3,560,164
Patented Feb. 2, 1971

3,560,164
CARBON BLACK REACTOR
Charles R. Venable, Jr., Bartlesville, Okla., assignor to Phillips Petroleum Company, a corporation of Delaware
Filed July 30, 1969, Ser. No. 845,959
Int. Cl. F27d 1/04
U.S. Cl. 23—259.5                                        6 Claims

ABSTRACT OF THE DISCLOSURE

A carbon black reactor in which the reaction zone and quench zone are formed of castable materials with the feed introduction zone being formed of refractory brick and precast shapes and closed by a removable cover insulated to form a suspended arch construction.

---

This invention relates to carbon black apparatus.

In one of its more specific aspects, this invention relates to carbon black reactors particularly suitable for the production of large particle carbon black.

In the production of large particle carbon black, it has been found essential to employ a reactor of unusually large diameter in order to establish low velocities through the reaction zone. Simultaneously therewith, however, due to the large size of the reactor and the high temperatures involved, temperature expansion problems have arisen. The carbon black reactor of the present invention has been found to solve these expansion problems.

According to the apparatus of this invention, there is supplied a carbon black reactor which comprises a plurality of reaction zones formed by refractory walls, the reactor being adapted at its one end with a removable head cover fitted with reactant inlets and at its opposite end with a product outlet conduit, the refractory walls of the reaction zone and quench zone being of castable construction with the refractory walls of the feed inlet zone being formed of preformed refractory shapes, the removable head cover of the feed inlet zone being comprised of a plurality of layers of castable refractory, the layers forming a suspended arch construction.

In the operation of carbon black reactors, it has been discovered that with the establishment of low velocity through-puts, there is a tendency toward high temperature decomposition of that portion of the reactor in which the reactants are introduced. This problem has been solved by the apparatus of the present invention which combines novel construction and a high degree of mobility of those parts subjected to the expansion produced by the high temperature.

Figure 1:
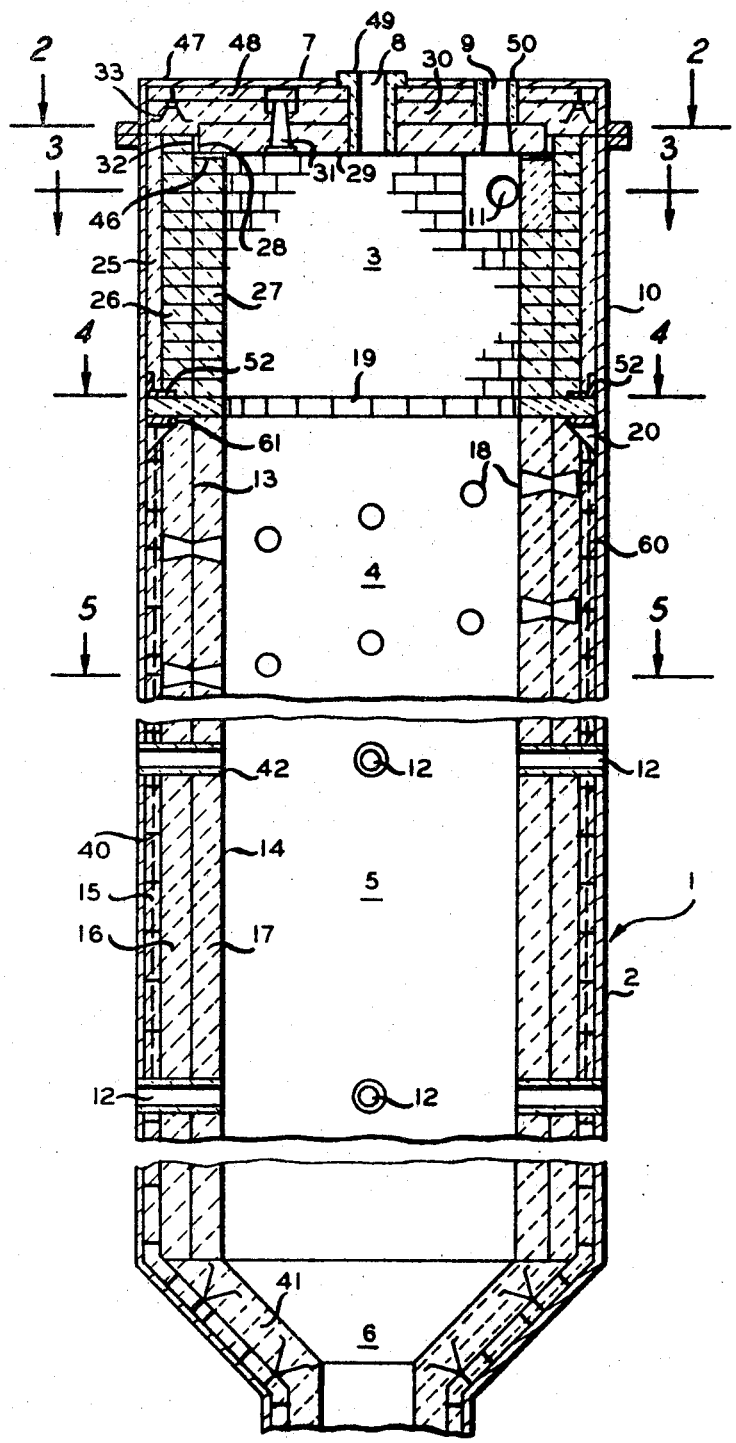
Figure 2:
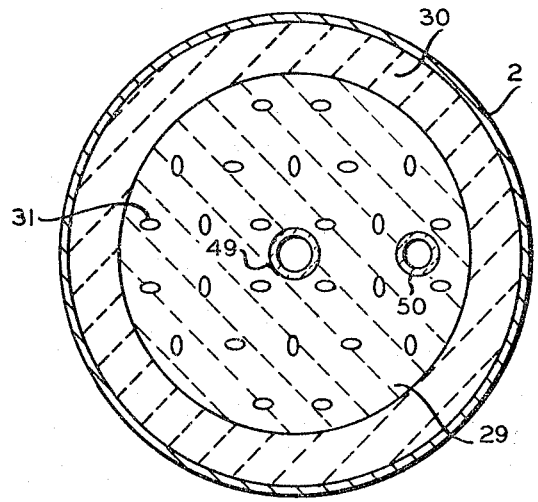
Figure 3:
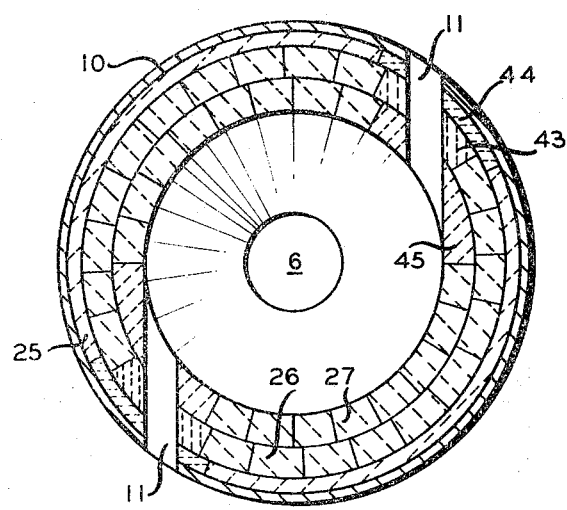
Figure 4:
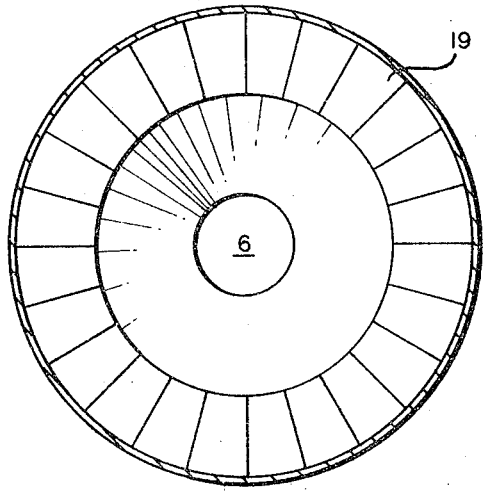
Figure 5:
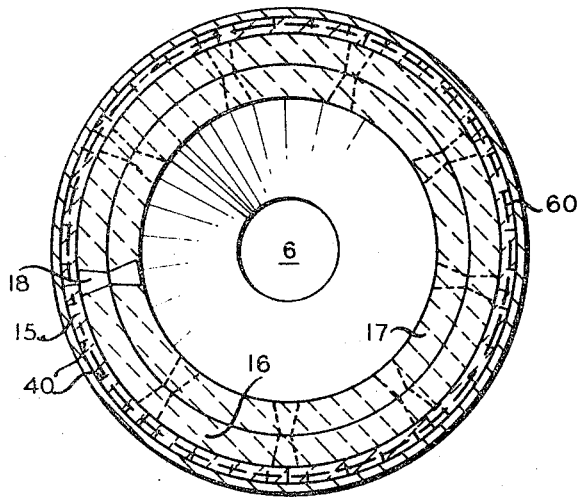

The apparatus of this invention will be more readily understood if explained in conjunction with the attached drawings in which FIG. 1 is an elevational view of the carbon black reactor concerned; FIG. 2 is a sectional view through 2—2 of FIG. 1; FIG. 3 is a sectional view through section 3—3 of FIG. 1; FIG. 4 is a sectional view through section 4—4 of FIG. 1; and FIG. 5 is a sectional view through section 5—5 of FIG. 1.

Referring now to FIG. 1, there is shown a carbon black reactor 1 having an outer shell 2 and comprising, in axial contiguity, a feed introduction zone 3, a reaction zone 4, a quench zone 5 and an outlet conduit 6.

Feed introduction zone 3 is equipped with head 7 adapted with burner or feed oil introduction port 8 and opening 9. Wall 10 of zone 3 is adapted with inlet ports 11.

Quench zone 5 is adapted with a plurality of quench inlet ports 12, in diametric positioning at any suitable level.

The wall 13 of zone 4 and wall 14 of zone 5 are composed of suitable refractory in three courses. The outer course 15 adjacent the outer shell 2 extends from zone 3 to the outlet flange and is suitable for temperatures of 1900° F. It is retained at the inside of shell 2 by means of welded studs 40 and hex netting 60 positioned between the studs as shown in FIGS. 1 and 5.

Adjacent to course 15 in walls 13 and 14 is a castable insulation 16 suitable for maximum operating temperatures of about 2800° F. The inner course 17 is suitable for operations up to 3200° F. Supports between the outer and inner courses are provided by means of refractory anchors 18 which are welded at their one end to the internal wall of the steel shell 2 and positioned on staggered arrangement as shown in FIG. 1.

Proximate the area of zone 6, in the area of the quench and at that point where the walls slope inwardly to form outlet conduit 6, courses 16 and 17 are replaced by a single course 41 of castable insulation suitable for temperatures up to 3000° F.

The refractory anchors 18, affixed to the outer shell 2, which maintain courses 16 and 17 in position, are suitable for about 3100° F. operation.

Providing access as quench inlet ports 12 to zone 5 are ceramic tubes 42 which penetrate through the walls of the reactor and which have a permissible operating temperature of about 3250° F.

The construction of zone 3 differs appreciably from that of zone 4 and zone 5.

Separating zone 3 from zone 4 is a layer of keyed brick 19 disposed with their longitudinal axis perpendicular to the longitudinal axis of the reactor as shown in FIG. 4. These brick 19 have an operating temperature of about 3200° F. and are cut to a length equal to the thickness of the superimposed wall 10 of zone 3 and lower wall 13 of zone 4. They are supported on wall 13 of zone 4 by means of support ring 61 positioned on gusset plates 20, with angle ring 52 being positioned above brick 19 to facilitate their retention. The wall 10 of zone 3 is supported by brick 19. This wall consists of an outer course 25 of 1900° F. insulation, an intermediate course 26 of 2800° F. insulating fire brick and an inner course 27 of 3200° F. fire brick. The intermediate course 26 and inner course 27 are of equal thicknesses.

Port 11 through wall 10 is formed by pouring intermediate wall castable insulation 43 around a conduit form penetrating the wall and subsequently removing the form. This resulting entrance port is illustrated in FIG. 3. The outer shape 44 proximate port 11 is 1900° F. block insulation and the inner shape 45 is precast, the intermediate wall 43 being formed of a 2800° F. castable insulation.

The closure section of zone 3 is comprised of a suspended arch construction. The intermediate course 26 of zone 3 extends above the inner course 27 and forms a recession into which that facing 29 forming the inner or facing course of head 7 fits. This facing course 29 is comprised of castable refractory having a 3300° F. maximum allowable operating temperature. It seats on a 2700° F. insulation gasket 46 positioned on inner course 27. It is suspended from intermediate castable course 30 by 3100° F. operating temperature refractory hangers 31 which in turn are affixed to the outer head cover 47 of head 7. Inasmuch as intermediate course 30 and facing course 29 are individually cast and are otherwise unbonded together, facing course 29 forms a suspended arch which is free to expand as necessary and to prevent leakage at joint 32 between facing course 29 and intermediate course 26 of zone 3 and between the vertical edge 28 of facing course 29 and intermediate course 26. Intermediate course 30 is positioned apart from the outer head cover 47 by means of anchors 33, both hangers 31 and anchors 33 being affixed to the underside of head 7, a course of castable refractory 48, suitable for 1900° F. temperature, being interposed betwen course 30 and head 7.

As mentioned, inner course 27 of wall 10 of zone 3 is fabricated of a 3200° F. fire brick. Under operating conditions, it expands upward, forcing gasket 46 firmly against facing 29 to form a leakproof seal between zone 3 and its closure section.

The extent of the expansion of inner course 27 is of considerable importance in facilitating the formation of this leakproof seal under operating conditions of elevated temperature. Therefore, inner course 27 is comprised of brick of a comparatively dense structure and with a low coefficient of expansion but with a coefficient of expansion which is high in comparison to that of the castable insulation 17 in zones 4 and 5. Relatedly, the height of zone 3 is kept to a minimum to limit the expansion of wall 27, in order that the extent of the expansion of wall 27 will be predictable with considerable accuracy. The height of zone 3 will be primarily determined by the flame characteristics of the combustion conducted therein, it having been determined that a zone height of about four feet satisfies these requirements, regardless of the heights of the other sections of the furnace or of the overall height of the furnace.

The unitary construction of this expandable head member not only permits the expansion of refractory course 29 under operating conditions but also allows the removal of flanged head 7 and the refractory integral therewith as a unit. Additionally, the support of facing course 29 is borne not only by the hangers 31 and head cover 7 but is supported by wall 10 of zone 3. Port 8 and opening 9 of head 7 are advantageously formed of ceramic tube-shaped openings 49 and 50 around which are cast the castables forming head courses 29, 30 and 48.

It will be appreciated that the apparatus of this invention can be modified from the description given in the foregoing. However, such modifications are considered as being within the scope of the invention.

What is claimed is:

1. In a carbon black reactor comprising a feed introduction zone, a reaction zone and a quench zone in axial contiguity, said reactor being enclosed by refractory walls and being adapted with reactant inlets communicating with the feed introduction zone and product outlet conduit communicating from said quench zone, the improvement comprising said refractory walls being constructed of a plurality of courses, at least two inner courses of said reaction zone and quench zone formed of castable insulation and at least two inner courses of said feed introduction zone being formed of refractory shapes.

2. The apparatus defined in claim 1 in which said feed introduction zone is closed by a removable member comprising a plurality of courses of castable refractory.

3. The apparatus defined in claim 2 in which said refractory walls are adapted to effect a substantially leakproof seal by expanding into contact with said removable member under operating conditions.

4. The apparatus defined in claim 2 in which one of said courses is suspended from another of said courses.

5. The apparatus as defined in claim 2 in which said feed introduction zone has a height of about four feet.

6. The apparatus as defined in claim 2 in which said feed inlet zone is adapted with an access port penetrating its wall at least a portion of the wall of said access port being formed of castable refractory.

References Cited

UNITED STATES PATENTS

| | | | |
|---|---|---|---|
| 1,021,851 | 4/1912 | Strale | 52—249X |
| 1,581,263 | 4/1926 | Freeman | 110—1(AX) |
| 2,839,825 | 6/1958 | Edwards, Jr. et al. | 264—30X |
| 2,903,876 | 9/1959 | Nannini | 263—46X |
| 3,172,924 | 3/1965 | Venable, Jr. | 264—30 |
| 3,202,486 | 8/1965 | Versluis | 23—284 |

FOREIGN PATENTS

| | | | |
|---|---|---|---|
| 314,772 | 6/1929 | Great Britain | 110—1A |

JAMES H. TAYMAN, JR., Primary Examiner

U.S. Cl. X.R.

23—209.4, 209.6; 52—249, 561; 110—1; 263—46; 264—30; 266—43